United States Patent
Krichever et al.

(10) Patent No.: US 6,845,915 B2
(45) Date of Patent: Jan. 25, 2005

(54) EXTENDED RANGE BAR CODE READER

(75) Inventors: Mark Krichever, Hauppauge, NY (US); Vladimir Gurevich, Stony Brook, NY (US); Daniel Brown, East Northport, NY (US); Mehul Patel, Fort Salonga, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/040,597

(22) Filed: Oct. 25, 2001

(65) Prior Publication Data

US 2002/0074403 A1 Jun. 20, 2002

Related U.S. Application Data

(63) Continuation-in-part of application No. 09/227,245, filed on Jan. 8, 1999, now abandoned, which is a continuation-in-part of application No. 08/794,782, filed on Feb. 3, 1997, now Pat. No. 6,119,944.

(51) Int. Cl.[7] .................................................. G06K 7/10
(52) U.S. Cl. ............................. 235/462.22; 235/462.45; 235/472.1; 396/73
(58) Field of Search .................... 235/462.2, 462.22, 235/462.23, 462.25, 462.26, 462.45, 472.01, 472.02, 472.03; 396/72–73, 382; 359/672, 821

(56) References Cited

U.S. PATENT DOCUMENTS

| | | | | |
|---|---|---|---|---|
| 3,836,934 A | * | 9/1974 | Suzuki et al. | 352/140 |
| 4,063,260 A | * | 12/1977 | Toyoshima | 396/176 |
| 4,129,369 A | * | 12/1978 | Kobayashi et al. | 396/377 |
| 5,473,149 A | * | 12/1995 | Miwa et al. | |
| 5,506,394 A | * | 4/1996 | Plesko | |
| 5,548,373 A | * | 8/1996 | Ueda | 355/55 |
| 5,600,121 A | * | 2/1997 | Kahn | |
| 5,617,304 A | * | 4/1997 | Huang | |
| 5,980,045 A | * | 11/1999 | Fujibayashi | |
| 6,098,877 A | * | 8/2000 | Barkan et al. | |
| 6,119,944 A | * | 9/2000 | Mulla et al. | |

* cited by examiner

Primary Examiner—Diane I. Lee
(74) Attorney, Agent, or Firm—Kirschstein, et al.

(57) ABSTRACT

A focusing lens is manually moved to extend a range of working distances in which a bar code symbol can be electro-optically read. The lens movement enables reading of close-in and far-out symbols. The lens movement can also be used to change operation between a reading mode and a pointing mode in which a visual display is created on a target.

13 Claims, 10 Drawing Sheets

EXTENDED RANGE BAR CODE READER

REFERENCE TO RELATED APPLICATIONS

This application is a continuation-in-part of U.S. patent application Ser. No. 09/227,245, filed Jan. 8, 1999 now abandoned, which is a continuation-in-part of U.S. patent application Ser. No. 08/794,782, filed Feb. 3, 1997, now U.S. Pat. No. 6,119,944.

This application is also related to U.S. patent application Ser. No. 08/936,288, filed Sep. 24, 1997, now U.S. Pat. No. 6,003,774.

BACKGROUND OF THE INVENTION

1. Field of the Invention

The invention relates to bar code readers having an extended range of working distances in which to read bar code symbols, as well as laser pointers and marking implements combined integrally with such readers.

2. Description of the Related Art

Various optical scanning systems and readers have been developed heretofore for reading indicia such as bar code symbols appearing on a label or on the surface of an article. The bar code symbol itself is a pattern of graphic indicia comprised of a series of bars of various widths spaced apart from one another to bound spaces of various widths, the bars and spaces having different light reflecting characteristics. The readers function by electro-optically transforming the spatial pattern represented by the graphic indicia into a time-varying electrical signal, which is in turn decoded into data which represent the information or characters encoded in the indicia that are intended to be descriptive of the article or some characteristic thereof. Such data is typically represented in digital form and utilized as an input to a data processing system for applications in point-of-sale processing, inventory control, distribution, transportation and logistics, and the like.

A variety of scanning devices is known. The scanner could be a wand type reader, such as shown in U.S. Pat. No. 5,508,504, herein incorporated by reference, including a light emitter and a detector fixedly mounted in the wand, in which case the user manually moves the wand across the symbol. As the wand passes over the bar code, the emitter and associated optics produce a light spot on the symbol, and the detector senses the light reflected back from the light spot passing over each bar and space of the symbol. Alternatively, an optical moving spot scanner scans a light beam, such as a laser beam, across the symbol; and a detector senses reflected light from the beam spot scanned across the symbol. In each case, the detector produces the analog scan signal representing the encoded information.

Moving spot scanners of this general type have been disclosed for example, in U.S. Pat. Nos. 4,387,297; 4,409,470; 4,760,248; 4,896,026; 5,015,833; 5,262,627; 5,504,316; and 5,625,483, all of which have been assigned to the same assignee as the instant application and each of which is hereby incorporated by reference. As disclosed in some of the above patents, one embodiment of such a scanning system resides, inter alia, in a hand-held, portable laser scanning device supported by a user, which is configured to allow the user to aim the scanning head of the device, and more particularly, a light beam, at a targeted symbol to be read.

The light source in a laser scanner bar code reader is typically a semiconductor laser. The use of semiconductor devices as the light source is especially desirable because of their small size, low cost and low voltage requirements. The laser beam is optically modified, typically by an optical assembly, to form a beam spot of a certain size at the target distance. It is often preferred that the cross section of the beam spot measured in the scanning direction at the target distance be approximately the same as the minimum width in the scanning direction between regions of different light reflectivity, i.e., the bars and spaces of the symbol. Although typical readers utilize a single laser source, other bar code readers have been proposed with two or more light sources of different characteristics, e.g., different frequencies.

In the laser beam scanning systems known in the art, a single laser light beam is directed by a lens or other optical components along the light path toward a target that includes a bar code symbol on the surface. The moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the pattern of the symbol, or scan the field of view of the scanner, or do both. The laser beam may be moved by optical or opto-mechanical means to produce a scanning light beam. Such action may be performed by either deflecting the beam (such as by a moving optical element, such as a mirror) or moving the light source itself. U.S. Pat. No. 5,486,944 describes a scanning module in which a mirror is mounted on a flex element for reciprocal oscillation by electromagnetic actuation. U.S. Pat. No. 5,144,120 to Krichever et al., describes laser, optical and sensor components mounted on a drive for repetitive reciprocating motion either about an axis or in a plane to effect scanning of the laser beam.

The light beam is focused to the beam spot at a focal point, and the symbol is located within a depth of field at either side of the focal point. This depth of field represents the working distance in which the symbol can be successfully read. A symbol outside this working distance is not readable.

Because of the size and optical and electronic complexity of scanning systems and bar code readers, they generally have heretofore not been combined with writing or marking instruments or laser pointers in the same housing.

SUMMARY OF THE INVENTION

Objects of the Invention

It is an object of the invention to extend the range of working distances in which a symbol is successfully read.

It is another object of the invention to provide a portable instrument with a manual actuator to change a focal point of a laser beam from one distance to another.

It is still another object of the invention to provide a portable instrument with a manual actuator to read symbols located at different working distances.

It is yet another object of the invention to provide a portable battery-operated bar code reader in a pen-shaped housing that is able to acquire and store data from bar code symbols, and subsequently download such data to a computer. The bar code reader may be operated either as a wand, in which the bar code symbol, located a few inches from the end of the housing, is manually scanned by the user, or as a self-scanning unit using a mirror to scan the laser beam across the bar code symbol while the housing is in a fixed position.

It is another object of the invention to provide a portable instrument that can optionally be used as a laser pointer or as a bar code reader, or as a writing instrument.

Additional objects, advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

FEATURES OF THE INVENTION

In keeping with these objects, one feature of this invention resides, briefly stated, in a portable instrument for electro-optically reading coded indicia over an extended range of working distances. The instrument includes a housing having a size and a shape configured to be held in a user's hand during reading, and a plurality of electrical and optical components supported by the housing, for directing a light beam toward the indicia for reflection therefrom and for detecting light reflected from the indicia over a field of view. One of the components, e.g., a focusing lens, is movable between first and second positions in which the lens is operative for optically modifying at least one of the light beam and the reflected light at first and second optical areas, respectively.

A manual actuator is mounted on the housing for actuation by the user, and is operative for manually moving the lens between the first and second positions to selectively optically modify the light beam and/or the reflected light at the first and second optical areas, respectively.

In the case where the focusing lens is mounted in an outgoing path of the light beam toward the symbol, the lens focuses the light beam at first and second foci located outside the housing. These foci are located at different working distances and extend the range at which the symbol can be read.

In the case where the focusing lens is mounted in an incoming path of the reflected light from the symbol to a photodetector, the lens focuses the reflected light at the photodetector from symbols located at different working distances relative to the housing. Thus, symbols can be read over an extended range.

The instrument may also include a marking implement for marking a surface, and may further be configured as a laser pointer in which the focusing lens creates a visual display on a target in a pointing mode of operation in one of the aforementioned positions.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings. Further features of the invention are set out in the appended independent claims, and further preferred features are set out in the dependent claims.

DETAILED DESCRIPTION OF THE PREFERRED EMBODIMENTS

As used in this specification and in the appended claims, the term "indicia" broadly encompasses not only symbol patterns composed of alternating bars and spaces of various widths commonly referred to as bar code symbols, but also one or two dimensional graphic patterns, as well as alpha-numeric characters. In general, the term "indicia" may apply to any type of pattern or information which may be recognized or identified by scanning a light beam and detecting reflected or scattered light as a representation of variations in light reflectivity at various points of the pattern or information. A bar code symbol is one example of an "indicia" which the present invention can scan.

Figure 1A:
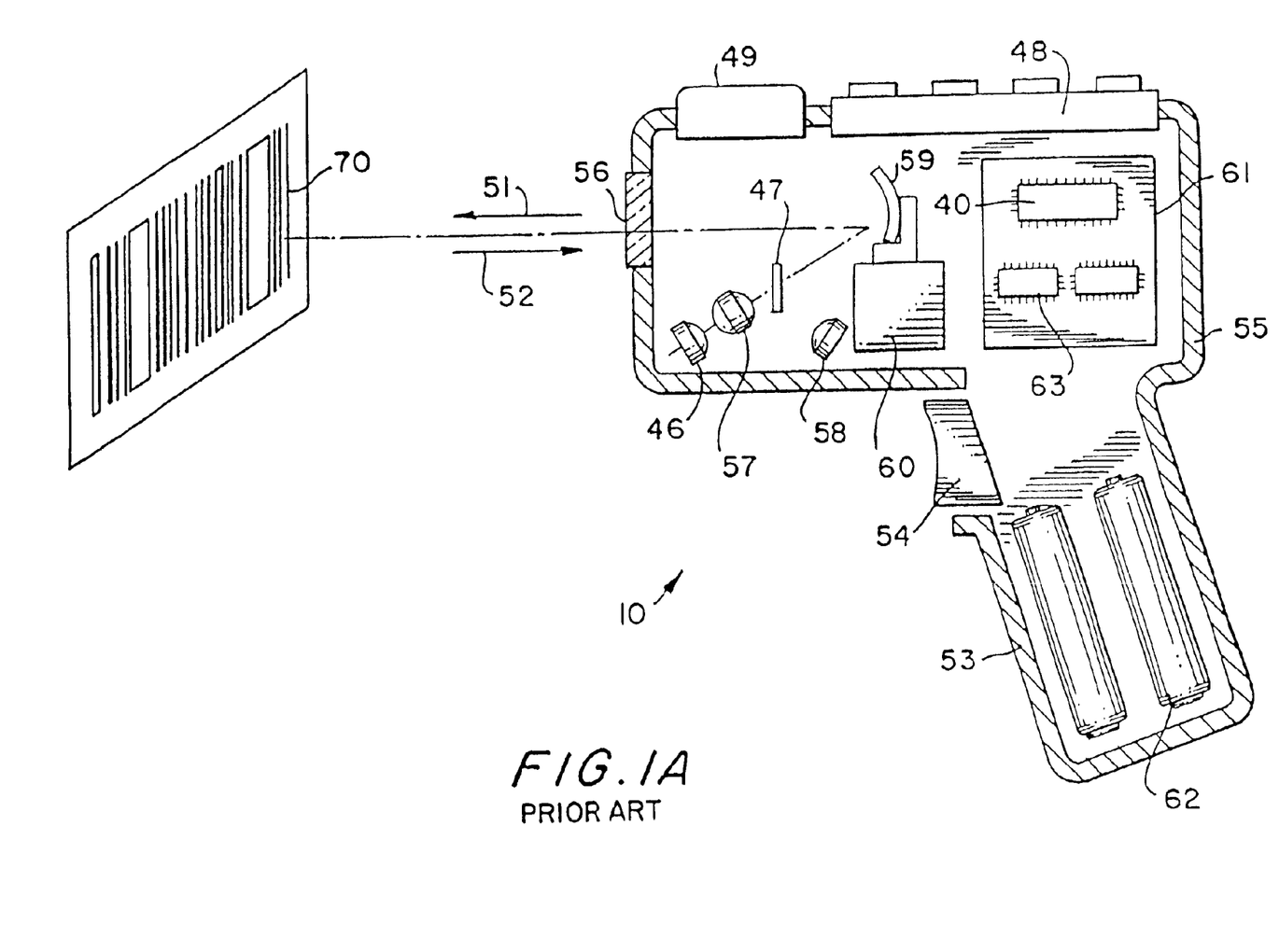
FIG. 1A is a schematic view of a prior art hand-held laser scanner and data collection terminal.

FIG. 1A illustrates an example of a prior art bar code symbol reader 10 implemented as a gun-shaped device, having a pistol-grip type of handle 53. A lightweight plastic housing 55 contains a light source 46, a detector 58, optics 57, signal processing circuitry 63, a programmed microprocessor 40, and a power source or battery 62. A light-transmissive window 56 at the front end of the housing 55 allows an outgoing light beam 51 to exit and an incoming reflected light to enter. A user aims the reader 10 at a bar code symbol 70 from a position in which the reader 10 is spaced from the symbol, i.e., not touching the symbol or moving across the symbol.

As further depicted in FIG. 1A, the optics may include a suitable lens 57 (or multiple lens system) to focus the scanned beam into a scanning spot at an appropriate reference plane. The light source 46, such as a semiconductor laser diode, introduces a light beam into an optical axis of the lens 57, and the beam passes through a partially-silvered mirror 47 and other lenses or beam shaping structures as needed. The beam is reflected from an oscillating mirror 59 which is coupled to a scanning drive motor 60 energized when a trigger 54 is manually pulled. The oscillation of the mirror 59 causes the outgoing beam 51 to scan back and forth in a desired pattern.

A variety of mirror and motor configurations can be used to move the beam in a desired scanning pattern. For example, U.S. Pat. No. 4,251,798 discloses a rotating polygon having a planar mirror at each side, each mirror tracing a scan line across the symbol. U.S. Pat. Nos. 4,387,297 and 4,409,470 both employ a planar mirror which is repetitively and reciprocally driven in alternate circumferential directions about a drive shaft on which the mirror is mounted. U.S. Pat. No. 4,816,660 discloses a multi-mirror construction composed of a generally concave mirror portion and a generally planar mirror portion. The multi-mirror construction is repetitively reciprocally driven in alternate circumferential directions about a drive shaft on which the multi-mirror construction is mounted.

The light 52 reflected back by the symbol 70 passes back through the window 56 for transmission to the detector 58. In the exemplary reader 10 shown in FIG. 1A, the reflected light reflects off of mirror 59 and partially-silvered mirror 47 and impinges on the light sensitive detector 58. The detector 58 produces an analog signal proportional to the intensity of the reflected light 52.

The signal processing circuitry includes a digitizer 63 mounted on a printed circuit board 61. The digitizer processes the analog signal from detector 58 to produce a pulse signal where the widths and spacings between the pulses correspond to the widths of the bars and the spacings between the bars. The digitizer serves as an edge detector or wave shaper circuit, and a threshold value set by the digitizer determines what points of the analog signal represent bar edges. The pulse signal from the digitizer 63 is applied to a decoder, typically incorporated in the programmed microprocessor 40 which will also have associated program memory and random access data memory. The microprocessor decoder 40 first determines the pulse widths and spacings of the signal from the digitizer. The decoder then analyzes time widths and spacings to find and decode a legitimate bar code message. This includes analysis to recognize legitimate characters and sequences, as defined by the appropriate code standard. This may also include an initial recognition of the particular standard to which the scanned symbol conforms. This recognition of the standard is typically referred to as autodiscrimination.

To scan the symbol 70, the user aims the bar code reader 10 and operates movable trigger switch 54 to activate the light source 46, the scanning motor 60 and the signal processing circuitry. If the scanning light beam 51 is visible, the operator can see a scan pattern on the surface on which the symbol appears and adjust aiming of the reader 10 accordingly. If the light beam 51 produced by the source 46 is marginally visible, an aiming light may be included. The aiming light, if needed, produces a visible light spot which may be fixed, or scanned just like the laser beam 51. The user employs this visible light to aim the reader at the symbol before pulling the trigger.

The reader 10 may also function as a portable data collection terminal. If so, the reader 10 would include a keyboard 48 and a display 49, such as described in the previously noted U.S. Pat. No. 4,409,470.

Figure 1B:
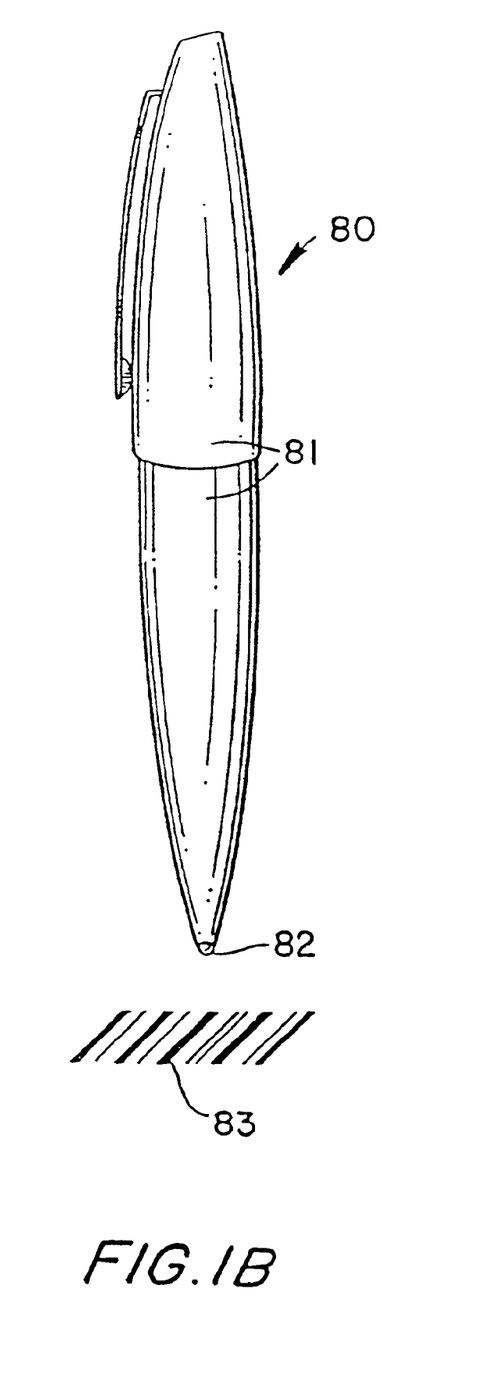
FIG. 1B shows a hand-held pen-type optical reader.

In view of the relative simplicity, availability and adaptability of information systems including bar code symbol data storage capability, it is desirable to develop systems particularly suitable for consumer applications. An optical reader which has many consumer applications is shown in FIG. 1B. The arrangement, generally designated as 80, comprises a pen-shaped main body 81 having at its writing end an optical scanner element light emitter and detector 82 for reading a bar code symbol illustrated schematically as 83. The pen may also include actual writing capability, for example, by having the writing nib adjacent the optical element 82 or, indeed, having the writing element and the optical element 82 at opposing ends. It is desired to increase the range of applications for such a product. The data processing capabilities of such a system 80 are limited by its physical size and power supply potential consequently limiting the range of applications of the arrangement. In addition various problems arise in actual operation of such a system, in particular in regulating the varying speeds at which consumers scan given bar code symbol 83.

Figure 2:
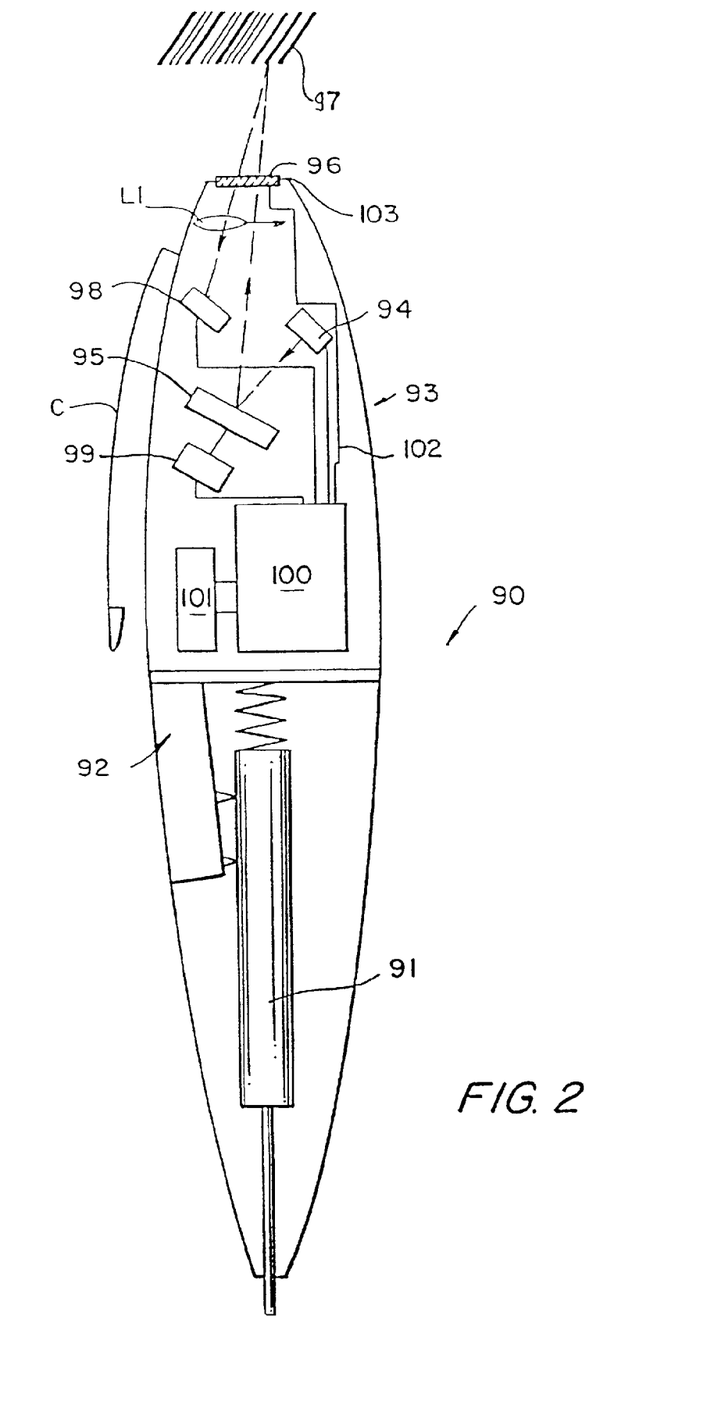
FIG. 2 shows the principal components of a pen-type optical reader.

An embodiment of an optical reader to be used in conjunction with the present invention is shown in FIG. 2. Although a pen-type optical reader is shown, it will be appreciated that any other hand-held configuration would be appropriate for use in conjunction with the present invention. Although specific constructional details are also discussed in more detail below, it will be appreciated that data storage/processing elements and optical reader elements of known type can replace the specific components discussed in a manner that would be well known to the skilled man. A discussion of pen-type readers is found in U.S. Pat. No. 5,506,399 commonly assigned herewith and incorporated herein by reference.

The pen-type optical reader (henceforth referred to as a "pen reader") is generally referenced 90 in FIG. 2. It will be appreciated that the exact shape of the pen reader as illustrated 90 may be exaggerated, for example in width, in order to more clearly each of the principal components and how they interact. In the embodiment shown, the pen reader 90 comprises a ballpoint pen 91, 92 together with the optical reader 93 itself. The pen reader need not actually have writing capability, or may be in the form of any suitable writing implement such as a pencil, a fountain pen, a marker pen and so forth. Indeed the optical reader sub-system discussed in more detail below can be in a modular form insertable into a suitably configured writing implement housing of any desired type.

The writing element of the pen reader 90 is shown schematically as a ballpoint pen cartridge 91 together with a projection/retraction mechanism generally designated 92 and of any suitable known type. Evidently it is desirable to reduce the size of those elements 91, 92 as far as possible to allow maximum space for the reader module.

The reader module is generally designated 93. The components and construction of the module 93 will be generally well known to the skilled man and are described only briefly hereafter for the purposes of completeness. The reader module 93 includes a light source 94, for example, a laser or LED and a reflector 95. A reading beam generated by the light source 94 is reflected by the reflector 95 out of a reading window 96. The reading beam is reflected by a bar code symbol generally designated as 97, passes once more through the reading window 96 and is received by a detector 98. The reader module 93 may be a field of view reader in which case the mirror 95 is a fixed mirror and the detector 98 comprises a CCD (charge coupled device) array, or a scanning system in which case reflector 95 is driven by a motor schematically shown at 99 for scanning motion. The light source 94, detector 95 and, if appropriate, motor 99 are connected to a processor, control and data storage element 100 in conjunction with a power source 101. The processor element 100 controls operation of the various components and also acts as a data storage and processing device for bar code information read by the module 93. As discussed in more detail below, it is desired to download the information stored in processor element 100 at a later stage to an external device. Accordingly a data output port is provided fed by line 102, preferably adjacent to or in conjunction with the reading window 96.

A particular implementation proposed according to the present invention for the pen reader 90 occurs in relation to consumer information access. For example, where a consumer carries a pen reader 90 and is reading a printed publication including advertisements, the text of the advertisements may not contain sufficient information concerning the product advertised, nor, of course can the advertisements act as any more than encouragement for the consumer to purchase the product should the consumer subsequently encounter the product, introducing the risk that the consumer may forget about the product.

Figure 3:
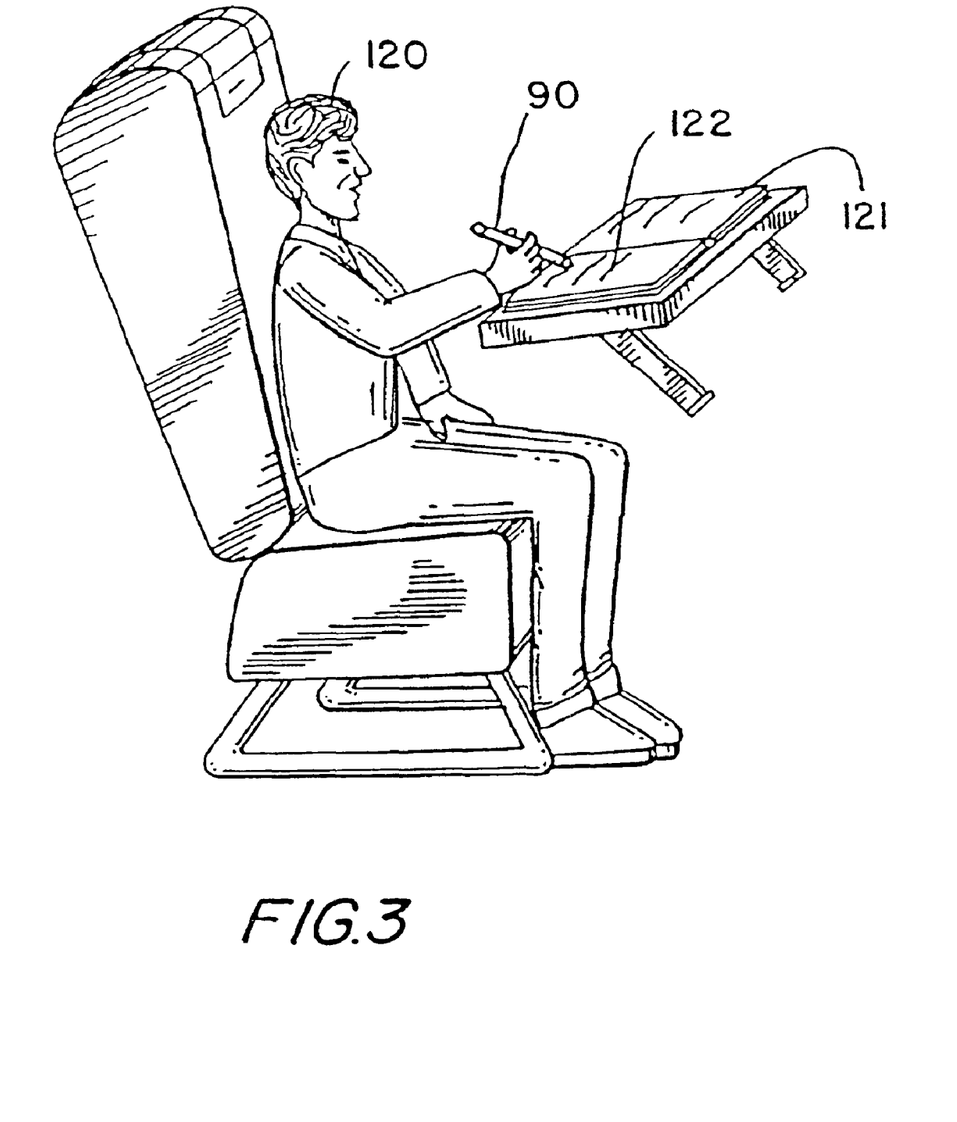
FIG. 3 demonstrates use of the pen-type optical reader.

Where, as in FIG. 3, the advertisement carries a bar code symbol 122, however, many of these problems can be rectified for a consumer 120 carrying a pen reader 90 of the type shown in FIG. 2. When an advertisement, for example, in a magazine 121 is of interest to the consumer 120 the consumer simply scans the corresponding bar code symbol 122 with the reader pen 90. The bar code information is stored in the processing element 100 and, to the extent desired, processed. In particular, information contained in the bar code symbol 122 relating to the advertised product is stored. As a result the consumer has an automatic reminder of the product he wishes to purchase as well as information relating to the product. Evidently, where the consumer 120 sees more than one product of interest, the relevant information can also be stored, the storage capabilities of the pen reader 90 being limited only by the storage space in the processor element 100.

A particular implementation of the present invention allows the consumer to subsequently download the information stored in the pen reader 90 in a manner described in more detail below. In particular the information can be downloaded to a personal computer or other access point to a computer or data network. The downloaded information can then be used in various different manners. For example the product can be ordered or additional information concerning the product can be accessed. A particular implementation proposed under the present invention is that the bar code symbol accompanying the advertisement contains sufficient information for the personal computer or access point to the computer network to access a site on the Internet (or comparable data storage system). This site can contain additional information concerning the advertised product, information concerning related products, price information, cross-references to further related sites, and the capability of ordering and paying for the product. This greatly simplifies the purchasing process and also ensures that the consumer does not forget a product which has caught his attention.

In addition, further information can be derived according to the present invention. For example the impact of the advertisement and popularity of the product can be accessed for future marketing purposes, and quantifying the amount of printing space that should be assigned to the advertisement based on its popularity. Preferably the pen reader 90 has a dedicated user and carries user identification information such as credit card number, or other identification carried under an approved system. As a result, during purchase of the product, details of the transaction can be based on that information. In addition a customer profile can be built up based on the consumer's buying patterns.

It will be seen that the system can be extended to other applications. For example where an abstract of text is printed together with a bar code symbol, the bar code symbol can contain information which, when downloaded, can provide access to additional or related text. Assuming high enough resolution, the bar code symbol can even be read off a VDU or other visual display system in a closed system in order to access additional information on the Internet.

Where the bar code symbol is for use in conjunction with the Internet or parallel system, the information contained in the bar code symbol effectively comprises an Internet address. When that information is downloaded to a personal computer, the personal computer communicates with a dedicated server which captures the Internet address and user identification information and re-routes to the advertiser's web site for information retrieval and delivery to the consumer's personal computer. Accordingly, the downloaded information would enable the PC to go directly to a relevant home page or a relevant sub-page. A resolution server on the system could be used to collect information from all users, not only for information purposes but also for billing and routing purposes.

Figure 4A:
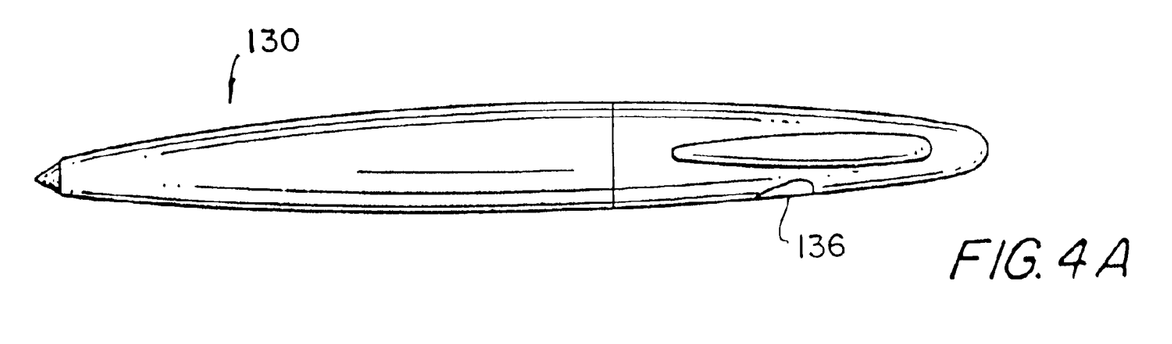
FIG. 4A shows an alternative version of the pen-type optical reader.
Figure 4B:
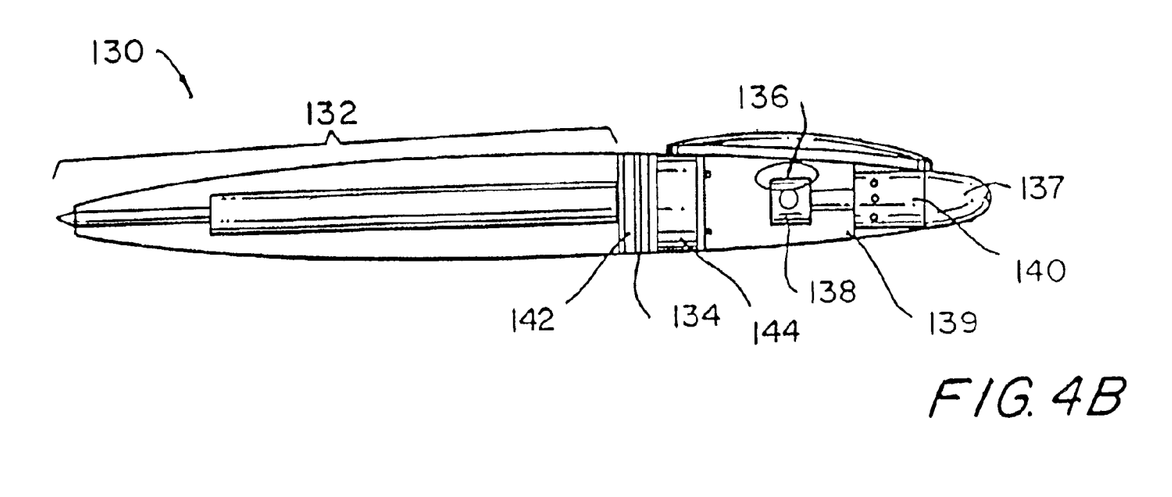
FIG. 4B shows in more detail the principal components of the pen-type optical reader shown in FIG. 4A.
Figure 5A:
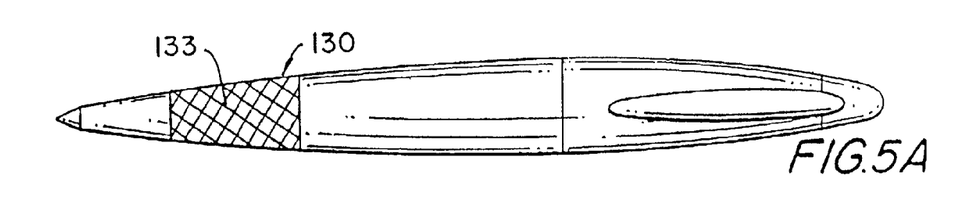
FIG. 5A shows a further alternative pen-type optical reader.
Figures 5B, 5C, 5D, 5E:
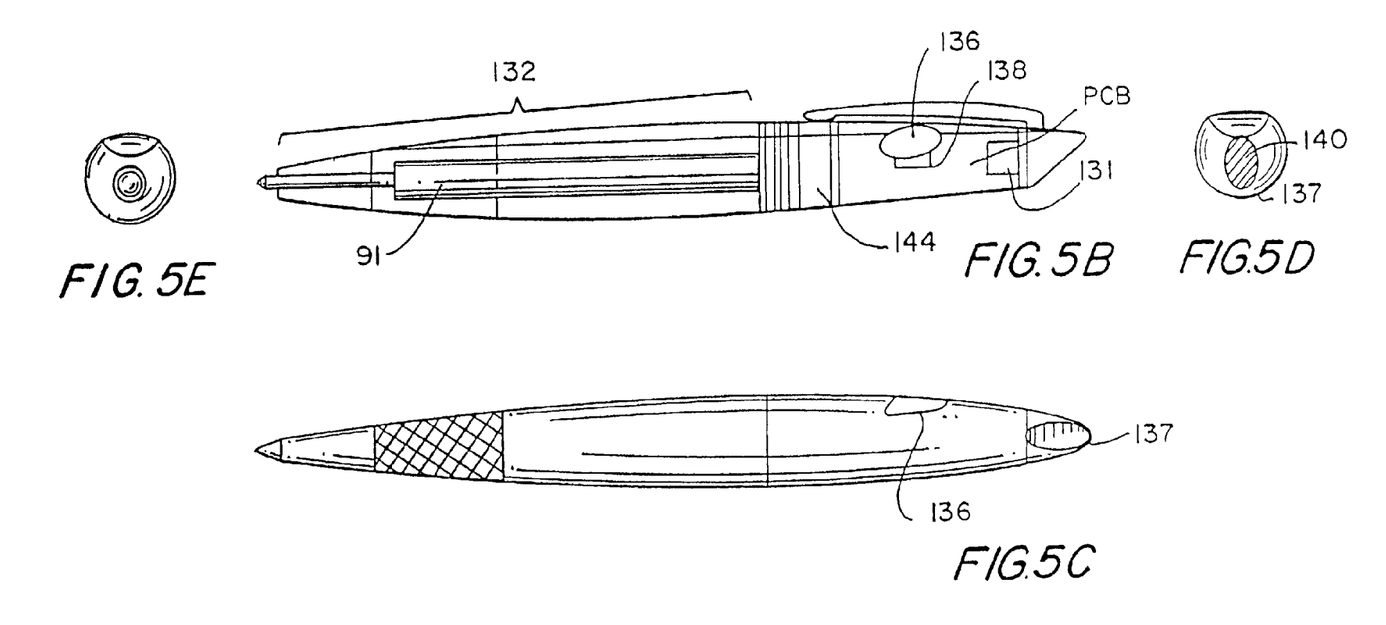
FIG. 5B shows in more detail the principal components of the pen-type optical reader of FIG. 5A.
FIG. 5C is a view of the pen-type optical reader of FIG. 5A from a different angle.
FIG. 5D and FIG. 5E are end views of the reader of FIG. 5B.

Various alternative pen reader configurations are shown. Referring firstly to FIGS. 4A and 4B a pen reader 130 includes a pen assembly 132 including a ball pen cartridge, for example, of the type sold under the trademark Zebra F-refill and an actuating mechanism 134 of a known type rotatable to extend and retract the ball pen cartridge. The pen reader 130 further includes a trigger 136 manually actuable to enable a scan together with a cooperating internal switch 138 example, code ITT KSC 421. The pen reader 130 includes a wand tip 140 for reading a bar code symbol. A data output port is also provided at 137. The system is powered by a battery 142 of any suitable compact type. Also included is a beeper 144 or other audible device which can sound to indicate to the user that a bar code symbol has been successfully read, that the battery power is low, that there is little memory space left and so forth. Different audible tones or sequences of audible tones can represent different warning signals. In addition the pen reader 130 can include a screen (not shown) carrying information as to the status of the pen reader and any instructions for use thereof.

FIGS. 5A to 5E show a slight variant in which, where appropriate, the same reference numerals have been used as for FIGS. 4A and 4B. It will be seen that the exit window for the reader (here known as a laser scanner at 131) is in an inclined face relative to the longitudinal axis of the pen reader 130, allowing improved ergonomics in reading a bar code symbol. The reader further includes a grip 133, for example made of leather, around a portion of its length allowing improved user grip and comfort.

Figure 6:
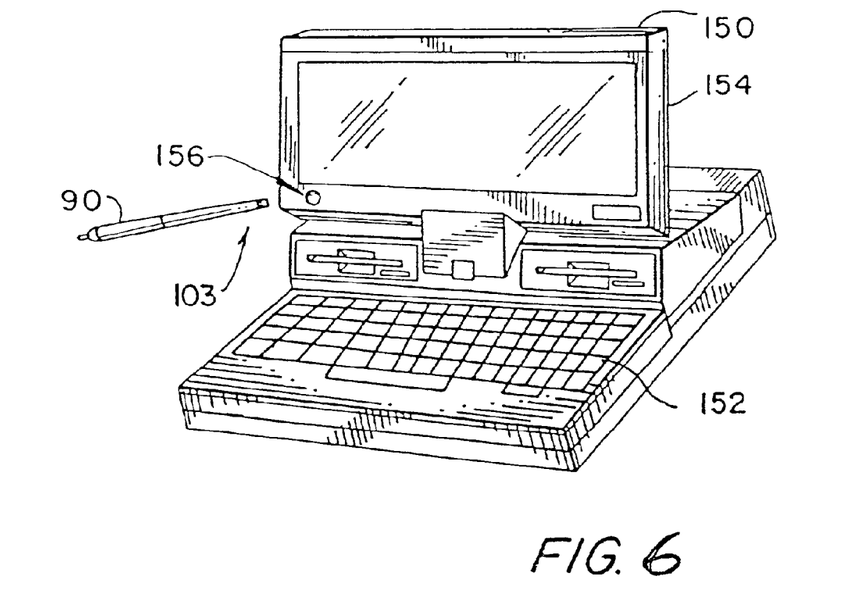
FIG. 6 shows one method of downloading information from a pen-type optical reader according to the present invention.
Figure 7:
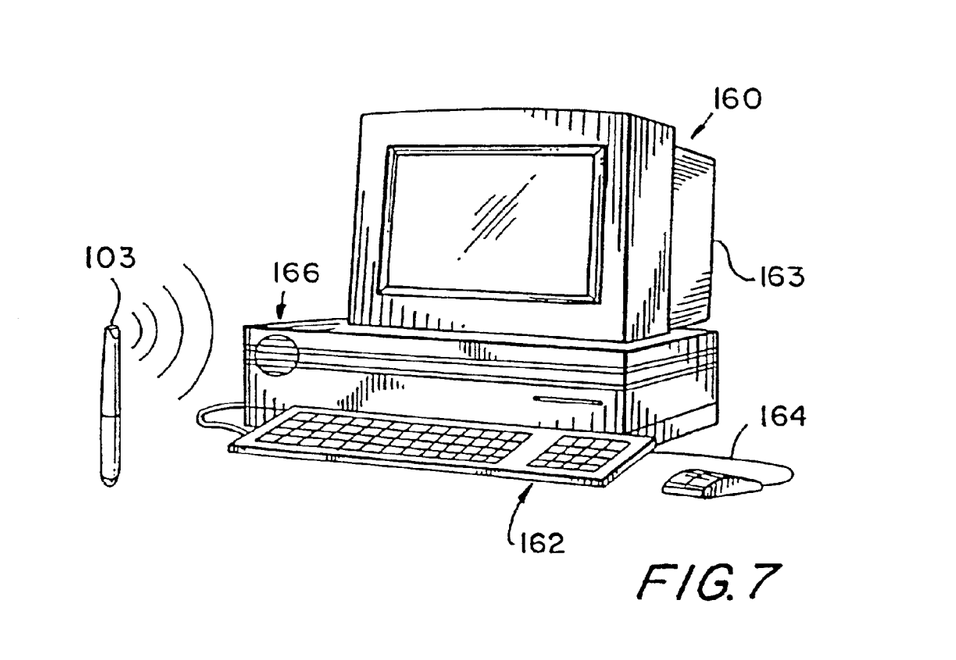
FIG. 7 shows an alternative method of downloading information from the pen-type optical reader according to the present invention.

Various methods of downloading the information are contemplated. Two approaches are shown in FIGS. 6 and 7. In a preferred configuration shown in FIG. 6 a personal computer is shown at 150 being of the portable type although a fixed type PC will also of course suffice. The personal computer 150 includes a keyboard 152 and a screen 154 and can generally be of conventional type. The personal computer 150 includes a data input port 156 arranged to communicate with the pen reader data output port 103. In the embodiment shown, the output port 103 of the pen reader 90 is touched against the data input port 156 on the personal computer 150. Touching the input port 156 firstly commences the downloading sequence and secondly allows accurate and rapid communication between the pen reader 90 and the personal computer 150. The interface between the pen reader data output port 103 and the data input port 156 can, for example, be of the "memory button" or "touch memory" type, for example, as sold by Dallas Semiconductors. The actual interface is of well known type and, in effect, the information stored in the pen reader 90 is communicated to the port 103 provided at an appropriate point on the pen reader 90. The information is converted to a suitable form for transmission at the port 103 and, on contact with the data input port 156 of the personal computer 150, the transmission is activated. The data input port 156 is configured to receive and convert into a suitable form information transferred from the output port 103. In particular the information can be transferred in the form of a series of electronic pulses representing bits. Such a system gives rise to a simple and substantially error-free interface allowing a user to download information stored in a pen reader 90 to a personal computer 150 quickly and accurately.

As will be appreciated, various other downloading methods are contemplated within the ambit of the present invention. For example as shown in FIG. 7 a fixed-type personal computer 160 including a keyboard 162, a display screen 163 and a mouse 164 includes a microphone 166 which receives an audio signal from a corresponding speaker data output 168 on a pen reader 90. A button (not shown) or other switch can be included on the pen reader 90 to activate transmission by the speaker 168. The information stored in the pen reader 90 is converted to a high frequency audio signal at the speaker 168 which is received by the microphone 166 and decoded. Of course the transmitter can transmit other forms of radiation, for example it can be an optical or microwave transmitter with a suitable receiver being provided on the personal computer.

Figure 8:
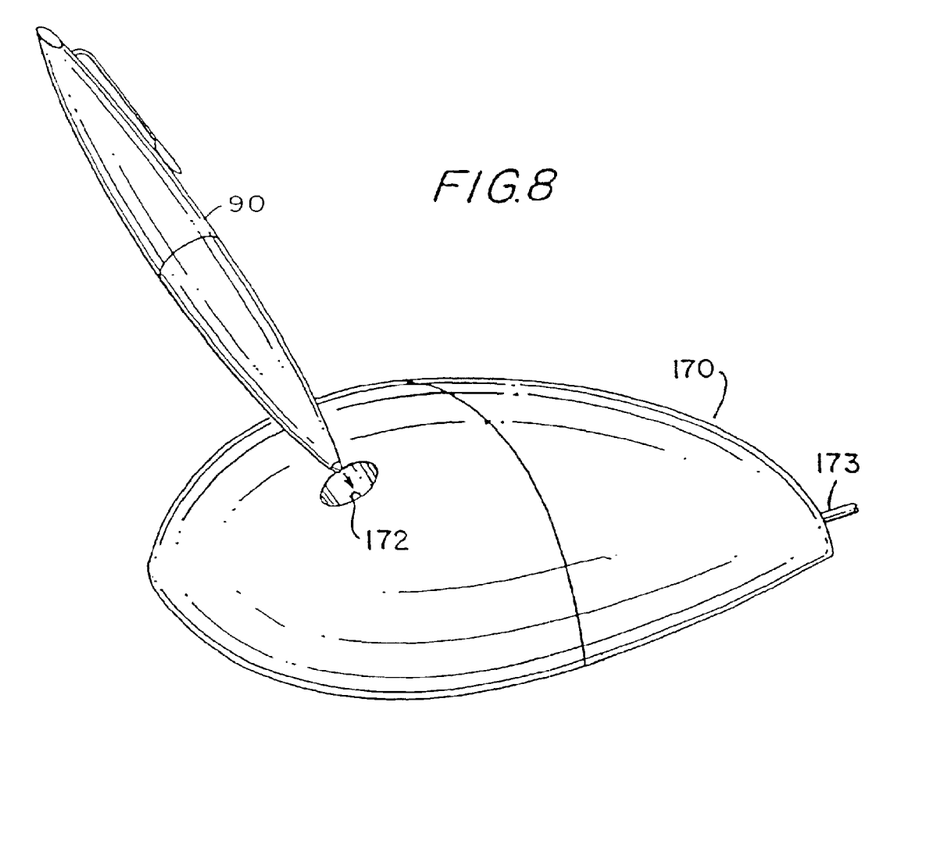
FIG. 8 shows a dedicated downloading port from the pen-type optical reader according to the present invention.

Yet a further downloading system is shown in FIG. 8. A dedicated data downloading port 170 includes an orifice 172 for receiving a pen reader 90. The port 170 communicates information downloaded from the pen reader 90 via a line 174. Referring to the sectional view shown in FIG. 9, it will be seen that the port 170 includes a data-receiving interface 174 of any of the types described above which communicates with the pen reader 90 for downloading of information. Downloading can be contact activated by contact between the pen reader 90 and the interface 174 or activated by pushing a button or other switch (not shown) on the pen reader. The interface 174 communicates with a processor 176 for converting the downloaded information if necessary into a format appropriate for a computer network, and the information is communicated to the computer network via line 173.

Figure 9:
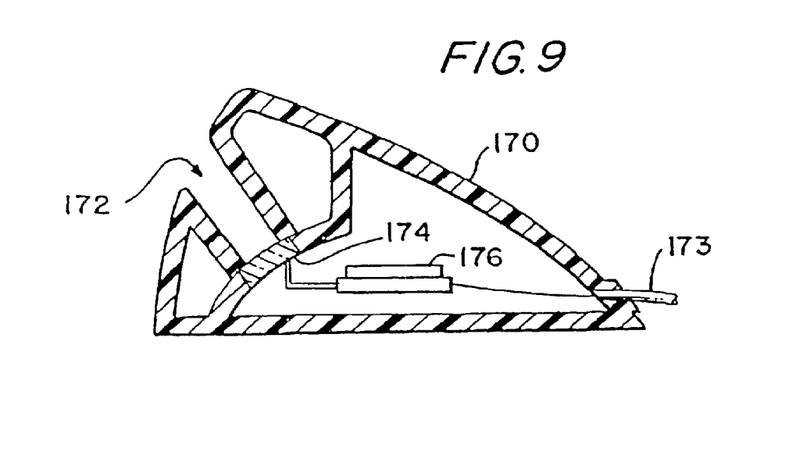
FIG. 9 is a sectional view of the downloading port shown in FIG. 8.

It will be seen that all of these methods comprise a user-friendly system for downloading scanned information from a pen reader. Use of a port of the type shown in FIGS. 8 and 9 is particularly suitable where it is not desired to rely on the consumer having a PC or other home access to a suitable computer network. The port can, for example, be provided at a retail outlet or other point of sale. It should be noted that the pen reader can also be writable via the data port, personal computer or other means (even a bar code symbol itself) to input user information of the type discussed above. This would facilitate short term usage of a pen reader allowing a given user to input information temporarily for the duration of his or her use of the pen reader, The range of applications of the system as a whole is evidently very wide. For example a consumer could use the pen reader while on an airplane or in other areas where access to the Internet was not immediately available. In addition to advertisements and editorial text of the type described above, the system could be used to store and access information concerning items in many other applications, for example in warehouse storage systems.

It will be seen that the above teachings relate to any scanner type suitable for hand-held scanning and being essentially portable, capable of reading a bar code symbol or similar information-carrying symbol. The information can be downloaded from memory in the hand-held scanner by means of any suitable interface to a personal computer or other access point or computer network, and corresponding information called up from an internet web site or corresponding main memory location.

Although the invention has been discussed with reference to certain housings, triggering or mode-switching mechanisms and other features of the disclosed embodiment, it will be understood that a variety of housing styles and shapes and triggering mechanisms could be used. Other conventional features of bar code reading systems can also be included if so desired. The invention is preferably implemented using miniaturized components such as those described herein or in the materials referenced herein, or otherwise known in the art.

Additionally, even though the present invention has been described with respect to reading one dimensional bar codes, it is not limited to such embodiments, but may also be applicable to more complex indicia scanning or data acquisition applications such as two dimensional bar codes and matrix array symbols comprised of geometric shapes. It is conceivable that the present invention may also find application for use with various machine vision or optical character recognition applications in which information is derived from indicia such as printed characters or symbols, or from the surface or configurational characteristics of the article being scanned.

In addition to being packaged in specific housings, the elements of the scanner may be implemented in a very compact assembly or OEM subassembly such as a single integral module or "scan engine". Such a module can interchangeably be used as the dedicated pointer/scanning element for a variety of different writing instruments, housings, operating modalities and types of data acquisition systems.

The module could advantageously comprise various optic subassemblies mounted on a support, and photodetection components, such as a photodiode, charge coupled or solid state imaging device. Control or data lines associated with such components may be connected to an electrical connector mounted to enable the module to be electrically connected to a mating connector associated with other elements of the data acquisitions system.

An individual module may have specific scanning or decoding characteristics associated with it, e.g., operability at a certain working distance, or operability with one or more specific symbologies or printing densities. The characteristics may also be defined through the manual setting or factory setting of control parameters associated with the module. The user may also adapt the data acquisition system to scan different types of articles or operate at different ranges, or the system may be adapted for different applications by interchanging modules in the data acquisition system through the use of a simple electrical connector.

The scanning module described above may also be implemented within a self-contained data acquisition unit or portable computer including one or more such components as keyboard, display, printer, data storage, application software, and databases. Such a unit nay also include a communications interface to permit the data acquisition unit to communicate with a host computer, or other components of a data processing system, or with remote computers through a local or wide area network or with the telephone exchange network, either through a modem, xDSL interlace or an ISDN interface, or by low power radio broadcast from a portable terminal to a stationary or mobile receiver and thereafter to other system components.

Although we refer to the optical reader 90 as a "pen reader" for convenience, it is to be understood that the reader may be operable either as a fixed beam "wand" type reader, in which the symbol is scanned by manual motion of the reader by the user to move the beam spot across the symbol, or a moving beam scanner in the reader itself in which a motor drive moves a mirror (or other optical element or assembly, including possibly the light emitter) to create a moving beam. The optical reader of the present invention may also be embodied in different housings other than "pen" shaped housings.

Another embodiment of the present invention provides the capability of optionally utilizing the pen reader 90 as a light pointer, using the beam emitted from the light source 94 (which for reasons of visibility would typically be a semiconductor laser). Such laser pointers are useful for highlighting features in a slide presentation, allowing the lecturer to stand at some distance away from the screen. In such an application of the pen reader, the reflector 95 may or may not be activated, depending on whether one wanted a stationary spot pointer, or a pointer which projected the image of a line or circle on the target. The description of the operation of a convertible pointer/bar code reader (in a housing without the writing instrument) is described in greater detail in U.S. Pat. No. 6,003,774, which is hereby incorporated by reference.

Figure 10:
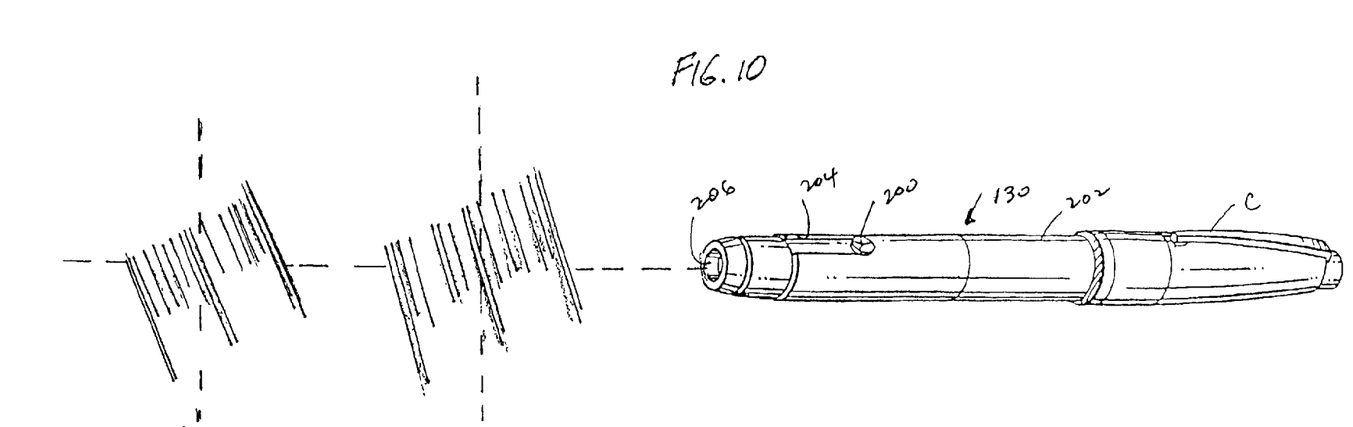
FIG. 10 is a perspective view of a pen-type optical reader operative over an extended range.

A manually operated multi-position trigger switch (such as the clip C in FIG. 2 or a slide switch as shown in the embodiment of FIG. 10) may be used to switch between the various modes of operation of the pen reader. In a first position of the switch, the laser diode 94 is switched off, and no beam is produced. In a second position, the laser diode is switched on and is reflected from the stationary mirror 95, thereby providing a fixed pointing beam. In a third position of the switch, the scanning mirror 95 is actuated, causing the beam to be scanned, thereby generating a visible line on the surface that is being pointed to. In the preferred embodiment, the scanning is in one dimension so that the resultant line on the screen is straight. In an alternative embodiment, however, the scanning mirror 95 could cause the beam to be scanned in two orthogonal directions, thereby forming any desired pattern, such as a Lissajoux pattern or a circle, on the screen. More complex scanning arrangements could also be envisaged, with the laser being turned on or off at predetermined intervals in conjunction with a predetermined scan path in a plane being implemented so that a predetermined image or curvilinear figure can be projected onto the screen such as a square or triangle, or a pattern of dots forming any other desired figure.

One of the differences between operating in a bar code reading mode and a pointing mode is that the target is located at, and the beam spot is focused at, a distance of a few inches in reading mode, and at ten or twenty feet in pointing mode. The laser diode itself will normally be packaged with a focusing lens that focuses the beam spot for bar code reading at a relatively short predetermined working range from the end of the reader. In order to implement a dual distance, and dual mode device, an additional lens L1 may be provided which is disposed within the housing and moved into the optical axis of the first focusing lens when the pointing mode is activated. Thus, in the pointing mode, the beam will pass through two lenses and will focus at a substantial distance away from the end of the pointer. Lens L1 may be mechanically moved in and out of the beam path by direct action of the switch being manually moved by the user between reading and pointing modes of operation.

For example, pushing the clip C in an inward direction may move the lens L1 along a track and click into a predetermined fixed position in the path of the outgoing laser beam. The track can be spring loaded, so that another movement of the clip C will release it, out of the beam path.

Alternatively, lens L1 may be fixed in position in the housing, and the beam path moved into either lens L1 or a clear path to the window. In that alternative, the beam path may be moved by the mirror, or by changing the position of the source.

If the trigger is a multi-position trigger, the positions of the trigger could be programmed so that different contacts correspond to different projected images. Thus, the pen could provide an image of a straight line when the trigger is set in a first position and a projected circle when the trigger is set in another position. Different positions of the trigger could also provide different lengths of line and/or different sizes of circle or other images that are being projected.

Scanning of the beam of course reduces the visibility of the image with respect to the visibility of the spot generated by a fixed beam. To compensate, the laser output power may be increased depending upon the position of the trigger or the mode of use.

The convertible laser pointer/scanner of this embodiment may also be embodied in a stylus for a pen computer, such as shown in U.S. Pat. No. 5,369,262, herein incorporated by reference. Such stylus can be used with active matrix or passive (pressure sensitive) display terminals. The laser pointer may also be embodied in a writing instrument, such as a pen or mechanical pencil, such as depicted in U.S. Pat. No. 6,119,944, herein incorporated by reference.

In addition to the above noted features, it is possible to incorporate other features into the pen including making it a miniature portable computer with a small (e.g. 1-line) LCD display, and a small number of input buttons for entry of data or control operations, or a trackball for scrolling. A voice recorder can also be implemented for taking dictation or reminder messages. A radio receiver may also be incorporated with the same housing so the unit may function as a pager with a small, one-line display.

Voice recognition or motion detection may be used to initiate operation of any predetermined computer function. To the extent a more sophisticated motion detection system could be implemented in the pen, handwriting recognition, signature verification or authorization, and similar functions could be implemented. The motion of the pen in space could also be captured in memory and translated into equivalent text so that the pen does not have to actually write on paper in order for the data "written" by the motion of the pen to be recorded.

Alternatively, the laser pointer may also be embodied within the housing of a portable, hand-held data terminal or computer (sometimes called a "personal digital assistant") such as depicted in U.S. patent application Ser. No. 09/047, 015.

Figure 11:
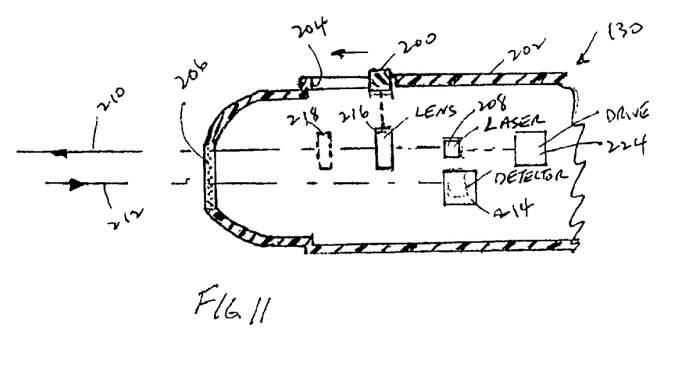
FIG. 11 is a broken-away sectional view of a front end of the reader of FIG. 10.

FIG. 10 discloses a pen reader 130 having a slide switch 200 mounted on a housing 202 for sliding movement between two end positions spaced apart along a slide channel or slot 204. As shown in FIG. 11, the front end region of the reader 130 has a light-transmissive window 206. A laser diode 208 emits a light beam 210 through the window 206 toward a symbol located exteriorly of the housing. Light 212 reflected from the symbol returns to the reader through the window and is detected by a photodetector 214.

A focusing lens 216 focuses the beam 210 to have a cross-section or beam spot at a certain distance from the window 206. The lens 216 is connected to the slide switch 200 and is jointly moved with the same between the illustrated solid and dashed line positions. In the first or solid line position, the lens 216 focuses the beam 210 at optical area or focal point $f_1$ (see FIG. 10). In the second or dashed line position 218, the lens 216 focuses the beam 210 at focal point $f_2$. A drive 224 oscillates the laser 208 in alternate circumferential directions to sweep the focal point.

A target bearing a symbol situated at focal point $f_1$, or situated within a depth of field at either side of the focal point $f_1$, is swept by the moving beam 210 and is eligible to be successfully read by the detector 214 sensing the reflected light 212 across the symbol and converting the latter to an electrical signal indicative of the symbol. Similarly, a target bearing a symbol situated at focal point $f_2$, or situated within a depth of field at either side of the focal point $f_2$, is swept by the moving beam 210 and is eligible to be successfully read by the detector 214 sensing the reflected light 212 across the symbol and converting the latter to an electrical signal indicative of the symbol.

The reader 130 has an extended range in which a symbol can be read, because the same symbol or different symbols can be positioned in the vicinity of either of the focal points $f_1$ or $f_2$. These focal points are spaced apart as considered along the propagation direction of the beam 210. Movement between the focal points is effected by sliding the switch 200 which, in turn, moves the focusing lens 216.

Also, if the focusing lens 216 is positioned in front of the detector 214, instead of the laser 208 (as depicted in FIG. 11), then the same symbol or different symbols can be positioned in the vicinity of either of the focal points $f_1$ or $f_2$, in which case, the reflected light is focused onto the detector 214. Preferably, the detector is a charge coupled device array.

Rather than oscillating the laser, the light beam 210 can be swept by a moving mirror, such as scan mirror 95 in FIG. 2. Rather than a pen-like shape, the reader 130 can be configured with a gun shape as in FIG. 1A, or with a box-like shape, or with any shape designed to be held in one's hand.

As described, the reader 130 can sweep a light beam and/or sweep a field of view over symbols positioned within an extended range of working distances, that is, anywhere within the depths of fields of both focal points $f_1$ and $f_2$. The reader 130 can also be configured, as described above in connection with FIG. 2, as a dual use instrument in which the positioning of the focusing lens in one position configures the instrument as a laser pointer, and in another position configures the instrument as a symbol reader.

In another modification, the reader 130 can be provided with a marking mechanism, such as elements 91, 92, to enable the reader to also serve as a writing or marking instrument.

Figure 12:
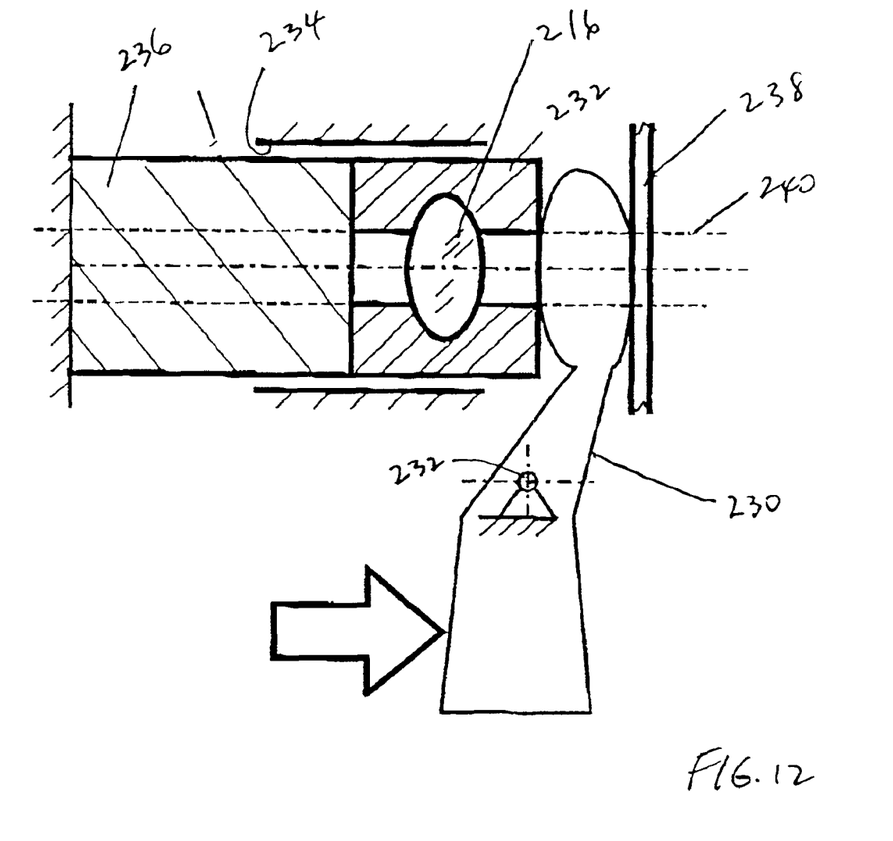
FIG. 12 is a sectional view of a lens-moving arrangement according to the present invention.

Rather than using a separate switch 200 to move the focusing lens, the trigger used to initiate scanning, e.g., the trigger 54 in FIG. 1A, may be employed to move the focusing lens. Thus, as shown in FIG. 12, a manually actuatable trigger 230 is manually depressed by a user in the direction of the arrow to initiate the reading mode. The trigger 230 pushes the focusing lens 216 held in a holder 232 along a linear track 234 against the restoring force of a damping element 236. The damping element 236 is compressed and is typically a spring or a foam block.

Upon release of the trigger, the compressed element 236 having a hysteresis characteristic smoothly pushes the holder and the lens back to their original positions against a stop 228. The lens 216 is thereby continuously moved between an infinite number of positions.

A clear optical path 240 is provided through the damping element 236, the holder 232, the lens 216, the trigger 230 and the stop 238, preferably by employing light-transmissive materials, or by forming bores through which the light passes. During each depression and release of the trigger, the lens 216 moves along the track 234 and focuses the light beam 210 and/or the reflected light 212 to multiple optical areas or foci, one of which will be optimum for reading a particular symbol.

The mechanism of FIG. 12 works differently from known triggered readers, since the user should release trigger 230 before the symbol is read. Typically, the trigger is held until the reading is completed. If necessary, a release can be added to the FIG. 12 mechanism to better conform to established operation.

The movement of the lens 216 is manually performed without the expenditure of electrical energy. This is particularly desirable in handheld, battery-powered instruments where energy conservation is needed for long term usage.

It will be understood that each of the elements described above, or two or more together, also may find a useful application in other types of scanners and bar code readers differing from the types described above.

While the invention has been illustrated and described as embodied in an extended range bar code reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A portable instrument for electro-optically reading coded indicia over an extended range of working distances, comprising:

a) a housing having a size and a shape configured to be held in a user's hand during reading;

b) a plurality of electrical and optical components supported by the housing, for directing a light beam along an optical path toward the indicia for reflection therefrom and for detecting light reflected from the indicia over a field of view, one of the components being movable between first and second positions in which said one of the components is operative for optically modifying at least one of the light beam and the reflected light at first and second optical areas, respectively, another of the components being an actuatable scanner for scanning said at least one of the light beam and the field of view;

c) a manual actuator mounted on the housing for actuation and movement by the user, the actuator being mechanically connected to said one of the components and being operative for manually directly moving said one of the components along the optical path between the first and second positions during joint movement with the actuator to selectively optically modify said at least one of the light beam and the reflected light at the first and second optical areas, respectively, the actuator being further operative for manually actuating the scanner to initiate reading; and d) a resilient element engaged with, and compressed by movement of, said one of the components to one of the positions by the actuator, the element being operative for urging and restoring said one of the components to the other of the positions upon release of the actuator by the user.

2. The instrument of claim 1, wherein another of the components is a light source for emitting the light beam, and wherein said one of the components includes a focusing lens for focusing the light beam at the first and second optical areas located in the range outside the housing, the first and second optical areas being foci located at different working distances relative to the housing.

3. The instrument of claim 1, wherein another of the components is a light detector for detecting the reflected light, and wherein said one of the components includes a focusing lens for focusing at the detector the reflected light from the indicia respectively located at the first and second optical areas in the range outside the housing, the first and second optical areas being located at different working distances relative to the housing.

4. The instrument of claim 1, wherein another of the components is a light detector for detecting the reflected light and generating an electrical signal indicative thereof, and a processor for processing the electrical signal into a processed signal during reading, and a memory for storing the processed signal for downloading.

5. The instrument of claim 1, and further comprising a marking implement supported by the housing for marking a surface.

6. The instrument of claim 1, wherein said one of the components is operative in one of the positions for creating a visual display on a target in a pointing mode of operation.

7. The instrument of claim 1, wherein the resilient element is a foam block.

8. The instrument of claim 1, wherein the resilient element is constituted of a light-transmissive material through which the light beam passes.

9. The instrument of claim 1, and a holder in which said one of the components is held, and wherein the resilient element bears against the holder.

10. The instrument of claim 9, and wherein the trigger bears against the holder.

11. The instrument of claim 10, wherein the trigger is constituted of a light-transmissive material through which the light beam passes.

12. The instrument of claim 9, and a linear track along which the holder is guided during movement of said one of the components.

13. The instrument of claim 1, wherein the resilient element occupies a smaller volume of space when compressed.

* * * * *